United States Patent
Biaud et al.

(10) Patent No.: US 8,272,689 B2
(45) Date of Patent: Sep. 25, 2012

(54) AUTOMOBILE SEAT FOR CHILDREN WITH VISUAL INDICATOR OF HARNESS TIGHTNESS AND CORRESPONDING VISUAL INDICATOR

(75) Inventors: Richard M. Biaud, Trementines (FR); Francois Renaudin, Cholet (FR)

(73) Assignee: Cosco Management, Inc., Columbus, IN (US)

(*) Notice: Subject to any disclaimer, the term of this patent is extended or adjusted under 35 U.S.C. 154(b) by 300 days.

(21) Appl. No.: 12/627,975

(22) Filed: Nov. 30, 2009

(65) Prior Publication Data

US 2010/0140997 A1    Jun. 10, 2010

(30) Foreign Application Priority Data

Dec. 4, 2008  (FR) ...................................... 08 58274

(51) Int. Cl.
*A47C 1/08* (2006.01)
(52) U.S. Cl. ...................... 297/250.1; 297/464; 297/483; 297/484
(58) Field of Classification Search .. 297/250.1–256.16, 297/464, 468, 469, 483, 484
See application file for complete search history.

(56) References Cited

U.S. PATENT DOCUMENTS

| | | | | |
|---|---|---|---|---|
| 5,181,773 | A * | 1/1993 | Colvin | 362/488 |
| 5,711,574 | A * | 1/1998 | Barnes | 297/216.11 |
| 5,965,827 | A * | 10/1999 | Stanley et al. | 73/862.391 |
| 6,623,032 | B2 * | 9/2003 | Curtis et al. | 280/735 |
| 6,854,415 | B2 * | 2/2005 | Barnes et al. | 116/67 R |
| 7,159,948 | B1 * | 1/2007 | Wolf | 297/463.1 |
| 7,219,958 | B2 * | 5/2007 | Yamazaki et al. | 297/256.13 |
| 7,422,283 | B2 * | 9/2008 | Patterson et al. | 297/250.1 |
| 2005/0092539 | A1 * | 5/2005 | Chitalia et al. | 180/271 |
| 2007/0228802 | A1 * | 10/2007 | Nakhla | 297/469 |

FOREIGN PATENT DOCUMENTS

| | | |
|---|---|---|
| EP | 0931691 | 7/1999 |
| EP | 1767408 | 3/2007 |
| WO | 2005092676 | 10/2005 |
| WO | 2005108154 | 11/2005 |

OTHER PUBLICATIONS

International Search Report dated Apr. 16, 2009, for French Application 0858274.
International Search Report dated Apr. 16, 2009, for French Application FR0858274.

\* cited by examiner

*Primary Examiner* — Laurie Cranmer
(74) *Attorney, Agent, or Firm* — Barnes & Thornburg LLP

(57) ABSTRACT

The present disclosure relates to an automobile seat for children. The seat includes a safety harness and a system of tightening the safety harness.

7 Claims, 3 Drawing Sheets

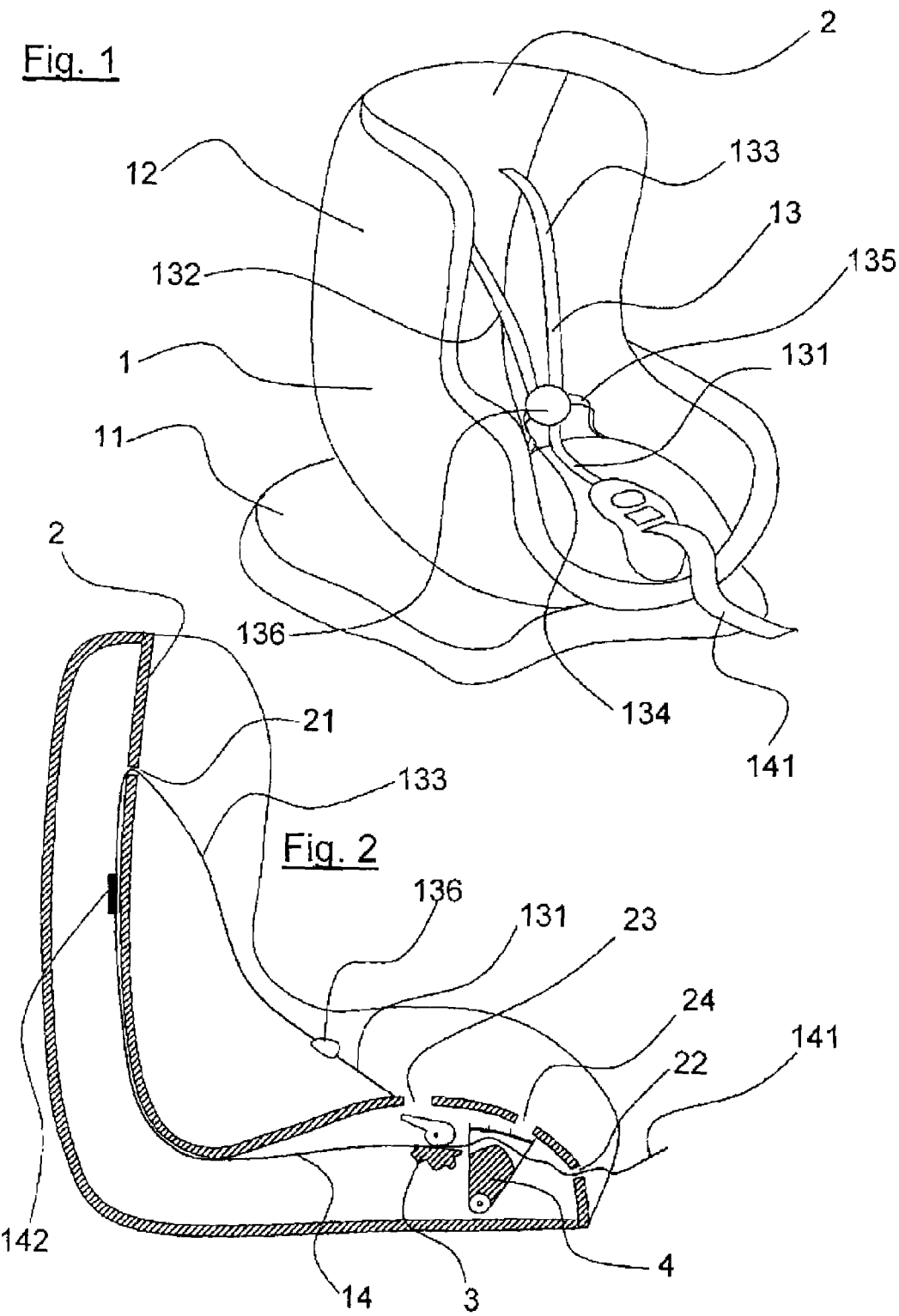

AUTOMOBILE SEAT FOR CHILDREN WITH VISUAL INDICATOR OF HARNESS TIGHTNESS AND CORRESPONDING VISUAL INDICATOR

FIELD OF THE INVENTION

The field of the invention is that of child care. More precisely, the invention relates to the field of safety of children transported in automobiles in seats provided for this purpose, called car seats, or seats for children.

SOLUTIONS OF PRIOR ART

In automobiles, young children are commonly installed in seated position in seats for children, which are then in turn attached to the seats for adult of the vehicle. Very many seat models exist, which have as a primary role to provide for the safety of the child in the event of impact.

For this, the child must be maintained in his seat by a harness. Harnesses are comprised of interlinked straps and fixed to the seat for child at least between the legs of the child, on his sides and over his shoulders. Conventionally, a locking device located at the centre of the harness makes it possible to buckle (attach) or unbuckle (detach) the straps.

In order to be effective, the straps comprising the harness must be sufficiently tight in order for the harness to be adjusted to the child (according to his size, corpulence and clothing, etc.), in such a way as to limit the displacement of the body in the event of impact. For this, different adjusting devices exist. These devices can be installed on each of the straps passing on the shoulders of the child, in order to increase or decrease their length. On other seat models, a single centralised adjusting device makes it possible to decrease or increase the length of several straps at the same time.

In order to allow an adult installing a child in a seat to check that the straps of the harness are sufficiently tightened, strap tension indicators are generally provided. These indicators can be located on one or several of the straps that must be tight and which deliver a visual indication, that is different according to whether the tension of the strap is sufficient (for example by a green indicator light) or not (for example by a red indicator light).

The information provided by these indicators makes it possible to improve the conditions of installing the child in his seat, and therefore improve his safety. However these indicators can also cause stress to the parents or adults installing the child. Indeed, the movements of the child, once he is installed, are able to modify the indication of tension provided by the indicator. As such, a movement of a child correctly installed in his seat can loosen a strap sufficiently so that a strap tension indicator provides the information that this strap is not sufficiently tight.

This slight drop in the tension of the strap, which can be momentary, is normal and is not detrimental to the safety of the child. The design tolerances are such that these variations are acceptable, when the harness has been sufficiently adjusted during the installation. However, this indication that the tension is insufficient can worry the parents, and encourage them to check the indicator regularly. This situation can be very dangerous if the adult driving the vehicle is encouraged to turn around in order to check the indicator, and even attempt, while driving, to retighten the straps of the harness of the child.

Moreover, this generated worry in parents can encourage the latter to tighten the straps excessively, which can result in discomfort for the child.

OBJECTIVES OF THE INVENTION

The invention has in particular for objective to overcome these disadvantages of prior art.

More precisely, an objective of the invention is to provide an indicator that makes it possible to provide an adult with information relating to the correct installation of the child in a seat for child by avoiding generating stress or unnecessary worry for this adult, during displacement.

Another objective of the invention is to provide a correct installation indicator that is simple and effective.

Another objective of the invention is to implement such an indicator that is particularly simple to manufacture, install and use.

SUMMARY OF THE INVENTION

These objectives, as well as others which shall appear in what follows, are achieved using an automobile seat for children, comprising a safety harness and means of tightening of said harness, implementing a tightening strap circulating in a unidirectional jammer and of which a free end extends to the front of the seat portion of said seat, in such a way as to be able to be grasped and pulled by a user in order to tighten said harness, which, according to the invention comprises a correct tightness visual indicator, mounted between said unidirectional jammer and said free end, and being able to temporarily take a correct tightness indication position, at the moment when the user applies on said free end a sufficient tightening tension, in such a way that the user knows that the tightness is correct at the time of tightening, said free end then being not tight.

The visual indicator can temporarily take an insufficient tightness indication position, when a tension is applied on said free end but this tension is insufficient.

The visual indicator can take an inoperative indication position, when no action is carried out on said free end.

The approach of the invention is based on a new and inventive approach, in relation to known techniques of strap tension indication, which are permanent indicators, placed on a portion of the harness that must be tight constantly. It is not a question, according to the invention, of providing such a permanent indicator, but on the contrary of providing instantaneous information of the correct installation of the child, at the instant when the user tightens the harness.

It is indeed essential that this information be provided during the installation, but is not useful, and sometimes dangerous (for example when a driver attempts to check while driving that the tension remains correct) that the information be permanent.

In other terms, the invention, in its simplest form, delivers a piece of unique and temporary information, at the time of tightening, of correct tightness.

As such, once the tightening has been carried out correctly, the user releases the free end of the strap, and the indicator is placed into an inactive state, separate from the active state wherein two positions of tightness (correct or insufficient) are distinguished. Once the installation is completed, the indicator does not provide information on the quality of the tightness, but indicates only that it is inactive. The indicator is only actually used during the tightening.

It is important to note that the tightness indicator is placed, according to the invention, on a portion of strap that has a free end, i.e. that is not tight in its normal state, even when the child is correctly strapped in the seat, and non on a portion of strap that must effectively be permanently tight, if a child is strapped. The position of the indicator on this free portion of strap is an essential aspect of the invention, since it can as such be active only temporarily, at the time of tightening, thus going against the a priori of those skilled in the art.

According to a particular embodiment, the seat portion of the seat has a viewing window across from which an information surface of the visual indicator is displaced, the information surface comprising at least one separate zone for each of the positions.

The visual indicator can as such be very simple and effective.

For example, the visual indicator comprises an element mobile in rotation around an axis attached to the seat portion of said seat.

According to an embodiment, the visual indicator can have a mobile part whereon circulates said tightening strap, said mobile part being conformed in such a way as to control the displacement of said indicator according to the tension of said tightening strap.

This mobile part makes it possible to connect the tension of the strap very simply to the visual indication provided.

The visual indicator can cooperate with means of retaining tending to return it towards the insufficient tightness indication position and/or towards the inoperative indication position. For example, these means of retaining include a spiral spring mounted on said axis.

According to a particular embodiment, the visual indicator has a green colour, in the correct tightness indication position; a red colour, in the insufficient tightness indication position; and a neutral colour, black, white or grey, in the inoperative indication position.

However, as indicated hereinabove, it is sufficient for the indicator to present information of correct tightness, in the correct tightness indication position. The two other indication positions are optional, and can be grouped together.

According to another embodiment, the visual indicator can deliver a lighted piece of information. The visual indicator can, in this case, include at least one light-emitting diode. The automobile seat can include then a tension sensor delivering an electrical signal relative to the tightness tension of the strap.

The visual indicator can occupy said correct tightness, insufficient tightness and inoperative indication positions using respectively a lighted green, red and extinguished signal, for example.

The invention also relates to a visual indicator for automobile seat according to the characteristics presented hereinabove.

LIST OF FIGURES

Other characteristics and advantages of the invention shall appear more clearly when reading the following description of a preferred embodiment, provided as a simple and non-restrictive example, and the annexed drawings, amongst which:

FIG. 1 shows in a simplified manner an example of a seat for child according to the invention;

FIG. 2 is a partial cross-section view of the seat for child in FIG. 1;

Figure 3:
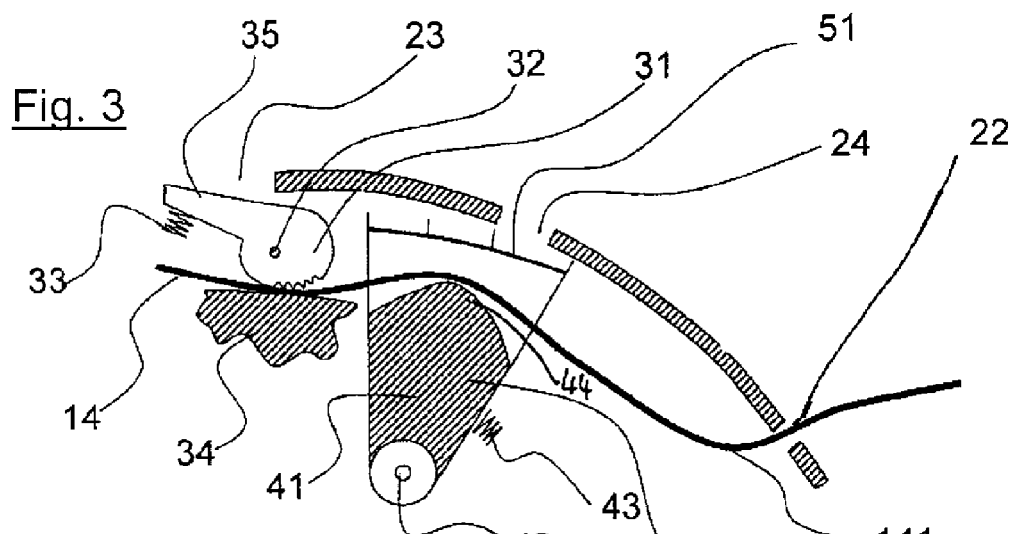
Figure 4:
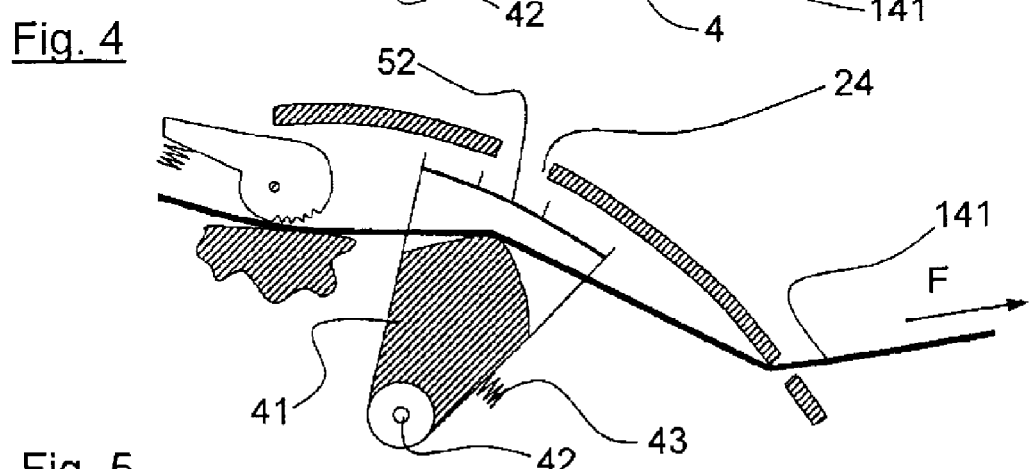
Figure 5:
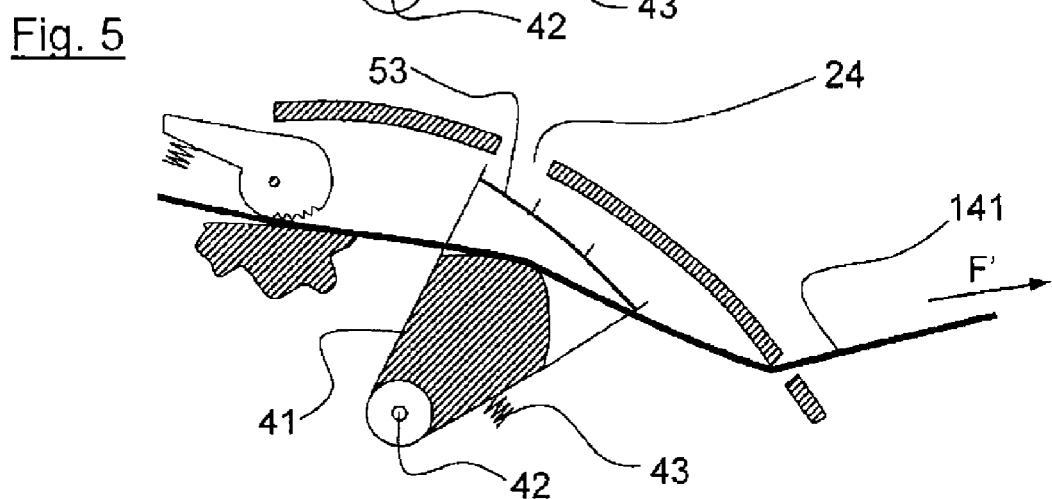
Figure 6:
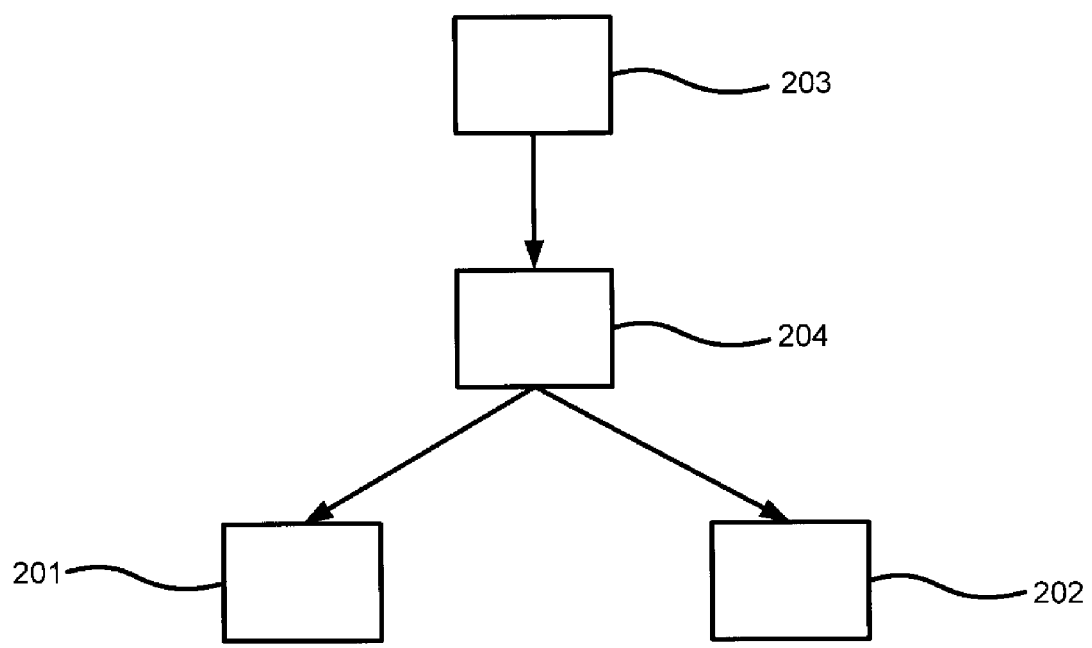

FIGS. 3, 4 and 5 are detailed cross-section views of the tightening mechanism and of the tightness indicator of the straps of the harness of the seat for children in FIG. 1, shown respectively outside of a tightening action, during an action of insufficient tightening force, and during an action of sufficient tightening force; and FIG. 6 is a block diagram showing the operation of the visual indicator when the latter delivers a lighted signal.

DETAILED DESCRIPTION OF THE INVENTION

The general principle of the invention consists in implementing a strap tension indicator on a portion of strap which is not intended to be tight permanently, but which is tight under the action of the user when the latter is carrying out the tightening of the straps of the harness. This indicator as such provides an instantaneous indication making it possible to the user to know if he has tightened sufficiently, but which will then be inactive.

FIG. 1 shows an automobile seat for children according to an embodiment of the invention. This seat 1 comprises a base 11 intended to be fixed to the automobile vehicle and a seat portion 12 provided to receive the child. A safety harness 13 is intended to retain the child.

For reasons of effectiveness and of compliance with the standards, this harness 13 is a "5-point" harness. It as such has a strap 131 passing between the legs of the child, two straps, or shoulder straps, 132 and 133 passing on the shoulders of the child and two straps 134 and 135 passing on his sides. These straps come together on a locking buckle 136 which makes it possible to assemble them or disassemble them according to need.

Conventionally, the adjusting of the harness, which makes it possible to adapt it to the corpulence of the child, is carried out by adjusting the length of the shoulder straps 132 and 133.

FIG. 2 shows a partial cross-section view of the seat for child in FIG. 1. Therein can be seen in particular the inside wall 2 of the seat and one of the shoulder straps 133 of the harness. As shown in this figure, the inside wall 2 of the seat has an opening 21 allowing for the passage of the shoulder strap 133. Behind the wall 2, the two straps 132 and 133 are connected to the same linking part 142, to which is also linked a tightening strap 14. As such, a traction on the tightening strap 14 makes it possible to reduce at the same time the useful length (i.e. extending over the front face of the seat) of the shoulder straps 132 and 133, and therefore to retighten the harness 13.

The tightening strap 14 is maintained by a unidirectional jammer 3, which makes it possible to avoid it loosening after having been tightened. The free portion 141 of this tightening strap 14, i.e. the portion which is located between the unidirectional jammer 3 and the end of the strap 14 which is not connected to the linking part 142, extends beyond seat 1 by the front of the latter, passing through an opening 22 defined in the inside wall of the seat. This strap 14 is as such very easily accessible to the user to tighten the harness 13.

FIGS. 3 to 5 make it possible to see the operating mechanism of the unidirectional jammer 3. This unidirectional jammer 3, also called self-tightening, is known per se. It can for example be one of those used by the Applicant on the seats of the Bebe Confort brand (registered trademark).

It comprises a cam 31 that can pivot around an axis 32, and is maintained under the effect of means of retaining (diagrammed under the reference 33) in a position wherein this cam places the strap 14 against a bearing surface 34 and prevents it from sliding in one direction (here, from right to left) while allowing it to slide in the other direction (here, from left to right). A lever 35, accessible to the adult user thanks to an opening 23 arranged in the inside wall of the seat, makes it possible to pivot the cam 31 in order to place it in a position allowing for the sliding of the strap in both directions. The user can as such, by simply actuating this lever 35, loosen the harness 13.

According to the invention, the free portion 141 of the tightening strap 14 cooperates with a correct tightness visual indicator, or strap tension indicator 4. This indicator 4 makes it possible to provide the user different information according to the level of tension of the strap 14. For this, it comprises a mobile part 41 that can pivot around an axis 42 between three positions, shown respectively in FIGS. 3, 4 and 5. This mobile part 41 comprises a zone forming a cam 44 whereon circulates the tightening strap, the cam being conformed in such a way as to control the displacement of the mobile part 41 according to the tension of the tightening strap 14.

In its position shown in FIG. 3, which is an inoperative position or inoperative indication position, the mobile part 41 induces a deviation on the path of the free portion 141 of the tightening strap 14 between the unidirectional jammer 3 and the opening 22. Means of retaining (diagrammed under the reference 43) tend to maintain the mobile part 41 in this position. With no action exerted on the free end 141 of the strap 14, the latter does not act on the mobile part 41.

The means of retaining which are diagrammed under the reference 43 can be advantageously comprised of a spiral spring mounted on the axis 42.

When the mobile part 41 of the indicator 4 is in this inoperative position, or inoperative indication position, it presents across from a viewing window 24 arranged in the inside wall 2 of the seat a first zone, or portion, of information surface 51 providing an inactive state indication, simply meaning that no significant traction is being exerted by the user on the strap portion 141, without providing information on the good or poor tension of the harness. This indication can be provided in a particularly simple manner by a neutral colour, for example black, white or grey, of the surface portion 51.

When traction is exerted on the portion of strap 141, as is shown in FIGS. 4 and 5, this portion of strap acts on the mobile part 41 of the strap tension indicator which then pivots around its axis 42, countering the spring 43.

FIG. 4 shows a situation wherein a force F that is insufficient to result in a correct tightening of the harness 13, is exerted by the user on the free portion 141 of the tightening strap 14. In this case, the action of the strap 141 on the mobile part 41 causes the positioning across from the viewing window 24 of a second zone, or portion, of information surface 52, which can advantageously be of red colour, providing an indication of insufficient tightness. This position shown in FIG. 4 is called insufficient tightness indication position.

FIG. 5 shows a position wherein the traction exerted by the user on the portion of strap 141 is sufficient for the harness 13 to be sufficiently well adjusted. In this case, the portion of strap 141 is sufficiently tight to act on the mobile part 41 in such a way as to bring across from the viewing window 24 its third zone, or portion, of information surface 53 providing an indication of correct tightness. This surface can for example be of green colour. This position is called correct tightness indication position.

The user can as such in a particularly simple manner check, while he is pulling on the free end of the strap 141, if the traction that he is exerting is sufficient. As long as the neutral or red colour appears in the viewing window 24, he knows that he is not pulling hard enough. However, one he see appear in the viewing window 24 the green colour indicating that the traction he is exerting is sufficient, he knows that he can release the strap 141, the harness being sufficiently tight. The strap tension indicator will then no longer provide any indication of tension, the neutral colour of the surface 51 appearing in the viewing window, which will avoid unnecessary and possibly dangerous verifications. He will know that the tightness is correct, since the latter was confirmed during the installation.

It is understood that the essential information corresponds to the indication of correct tightness. It is therefore possible to group the second and third positions together (hereinabove by way of example red and neutral), and even to suppress them. In this latter case, in the absence of information, the system is either inactive or insufficiently tight. The generation of visual information means that the tightness is sufficient, that the child is correctly strapped, and that the user can release the free end of the tightening strap.

In the example shown, the visual indicator of the tightness of the harness is implemented on a strap allowing for the centralised tightening of the two shoulder straps of the harness. Of course, those skilled in the art will easily be able to apply a principle identical to other tightening mechanisms of the harness, for example placed on shoulder straps, when the indicator reflects the tension of a free portion of strap, i.e. not permanently tight, and used specifically to provide the tightening, during the installation of the child.

He can also, without leaving the scope of the invention, use other types of unidirectional jammers or strap tension indicators.

Another embodiment is shown in FIG. 6. In this figure, the visual indicator 4 has a lighted signal that can be lit when the tightness is sufficient, and extinguished otherwise. In the example shown, it has been provided, as hereinabove, a lighting for example using a red light-emitting diode 201 in order to indicate an insufficient tightness and a green light-emitting diode 202 in order to indicate correct tightness, with neither one of these two diodes lit in a position of inactiveness where no tension is being applied to the free end of the strap.

This visual indicator can be coupled, as in this example, to a strap tension sensor 203 which delivers an electrical signal representing the tension applied to the strap portion. In this case, the electrical circuit 204 can be very simple, the electrical voltage of this signal can be configured in such a way as to exceed the threshold voltage of a light-emitting diode (LED), and therefore result in lighting it, when the strap tension is sufficient.

According to a more complex approach, the indicator can for example comprise a LED diode that can take several colours in order to deliver information to the user on the tightness of the strap.

Alternatively, the indicator can comprise several different LED diodes, as in the example shown, each corresponding to a position of the visual indicator.

An interest in having at least two lighted indications (correct tightness and incorrect tightness and/or inactive) is that the user is informed that the electrical system is operating correctly. If no lighted signal is generated, this means that a problem is detected, and for example a worn-out battery.

It is of course possible to provide to distribute several lighted indicators on the seat, for example so that they are visible on each side of the seat. The use of electrical signals indeed makes it possible to easily offset the indicators (and where applicable to combine them, for example with a sensor of the good installation of the seat, on Isofix clamps or a passage of strap of the safety belt of the vehicle).

The invention claimed is:

1. A juvenile vehicle seat comprising
a seat portion including a bottom formed to include a first strap opening and a backrest arranged to extend upwardly from the bottom and formed to include a second strap opening, a safety harness system configured to restrain a seated child seated on an upwardly facing portion of the bottom to lie against a forwardly facing portion of the backrest, the safety harness system including a shoulder belt adapted to embrace the seated child and arranged to extend through the second strap opening and along an oppositely facing rearwardly facing portion of the backrest away from the seated child supported by the forwardly facing portion of the backrest, a tightening strap coupled to the shoulder belt and arranged to extend under and along a downwardly facing portion of the bottom and away from the seated child supported on the upwardly facing portion of the bottom and through the first strap opening to provide a free end extending away from the bottom and the backrest, and a unidirection jammer arranged to lie under the bottom and configured to releasably grip a portion of the tightening strap to place the shoulder belt in tension while the seated child is seated on the bottom and restrained by the safety harness system, a tension detector configured to provide means for sensing tension in a portion of the tightening strap located between the unidirection jammer and the first strap opening formed in the bottom to indicate whether the shoulder belt is tensioned in compliance with predetermined tensioning criteria when the shoulder belt embraces the seated child during movement of the tightening strap in an outward direction through the first strap opening in response to application of a pulling force by a user to the free end of the tightening strap, and wherein the tension detector comprises a strap-tension indicator positioned to lie in a location under the bottom and between the unidirection jammer and the first strap opening formed in the bottom and mounted to contact the portion of the tightening strap located between the unidirection jammer and the first strap opening and to move relative to the bottom during movement of the tightening strap in the outward direction and an indicator-viewer window defined by a third opening formed in the bottom and arranged to cause an information surface included in the strap-tension indicator to be visible through the indicator-viewer window to a user applying the pulling force to the free end of the tightening strap while the seated child is seated on the bottom.

2. The juvenile vehicle seat of claim 1, wherein the strap-tension indicator includes an axle establishing a pivot axis and a mobile part mounted on the axle for pivotable movement about the pivot axis and the mobile part includes the information surface and a cam separated from the information surface and arranged to engage the portion of the tightening strap located between the unidirection jammer and the first strap opening formed in the bottom and wherein the information surface includes a first zone configured to provide an untensioned signal visible in the indicator-viewer window only when the mobile part is oriented to lie in an inoperative position relative to the bottom and to extend toward the unidirection jammer and a third zone configured to provide a tensioned signal visible in the indicator-viewer window only when the mobile part is oriented to lie in a correct tightness indication position relative to the bottom and arranged to extend away from the unidirection jammer.

3. The juvenile vehicle seat of claim 2, wherein the strap-tension indicator further includes spring means for yieldably urging the mobile part to pivot about the pivot axis in a first direction normally to assume the inoperative position when the tension in the portion of the tightening strap located between the unidirection jammer and the first strap opening and arranged to engage the cam is low such that the shoulder belt is not tensioned in compliance with the predetermined tensioning criteria and for allowing the mobile part to pivot about the pivot axis in an opposite second direction to assume the correct tightness indication position when the tension in the portion of the tightening strap located between the unidirection jammer and the second strap opening and arranged to engage the cam is relatively high owing to application of a relatively high pulling force to the free end of the tightening strap such that the shoulder belt is tensioned in compliance with the predetermined tensioning criteria.

4. The juvenile vehicle seat of claim 2, wherein the cam includes a convex surface arranged to face away from the pivot axis and to engage an underside of the portion of the tightening strap.

5. The juvenile vehicle seat of claim 2, wherein the cam is arranged to lie a first distance from the pivot axis, the information surface is arranged to lie a second distance from the pivot axis, which second distance is greater than the first distance, and the indicator-viewer window is arranged to lie a third distance from the pivot axis, which third distance is greater than each of the first and second distances.

6. The juvenile vehicle seat of claim 1, wherein the third opening formed in the bottom to define the indicator-viewer window is located between the backrest and the first opening formed in the bottom.

7. The juvenile vehicle seat of claim 6, wherein the bottom is formed to include a fourth opening arranged to provide means for allowing a user to access the unidirection jammer to release grip exerted by the unidirection jammer on the portion of the tightening strap and wherein the third opening is located between the first and fourth openings.

* * * * *